United States Patent
Kutz et al.

(10) Patent No.: US 11,558,823 B2
(45) Date of Patent: Jan. 17, 2023

(54) UTILIZATION OF ADDITIONAL BANDWIDTH IN A SIDELINK RESOURCE POOL

(71) Applicant: QUALCOMM Incorporated, San Diego, CA (US)

(72) Inventors: Gideon Shlomo Kutz, Ramat Hasharon (IL); Gabi Sarkis, San Diego, CA (US); Tien Viet Nguyen, Bridgewater, NJ (US); Assaf Touboul, Netanya (IL); Shay Landis, Hod Hasharon (IL); Tal Oved, Modiin (IL); Cheol Hee Park, San Diego, CA (US); Chu-Hsiang Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 17/228,475

(22) Filed: Apr. 12, 2021

(65) Prior Publication Data
US 2021/0360536 A1    Nov. 18, 2021

Related U.S. Application Data

(60) Provisional application No. 63/025,880, filed on May 15, 2020.

(51) Int. Cl.
*H04W 52/16* (2009.01)
*H04W 72/04* (2009.01)
*H04L 27/34* (2006.01)

(52) U.S. Cl.
CPC ......... *H04W 52/16* (2013.01); *H04L 27/3411* (2013.01); *H04W 72/04* (2013.01)

(58) Field of Classification Search
None
See application file for complete search history.

(56) References Cited

U.S. PATENT DOCUMENTS

2017/0188320 A1   6/2017 Xiong et al.
2019/0335532 A1 * 10/2019 Kim ............... H04W 72/12
(Continued)

FOREIGN PATENT DOCUMENTS

EP      2621219 A1 *  7/2013  ............. H04L 47/11
WO  WO-2021204206 A1 * 10/2021

OTHER PUBLICATIONS

Intel Corporation: "Sidelink Physical Structure for NR V2X Communication", 3GPP Draft, 3GPP TSG RAN WG1 Meeting #99, R1-1913255, 3rd Generation Partnership Project (3GPP), Mobile Competence Centre, vol. RAN WG1, No. Reno, Nevada, USA, Nov. 18, 2019-Nov. 22, 2019, Nov. 15, 2019 (Nov. 15, 2019), XP051825704, pp. 1-36, Retrieved from the Internet: URL: https://ftp.3gpp.org/tsg_ran/WG1_RL1/TSGR1_99/Docs/R1-1913255.zip R1-1913255 Intel - V2X_SL_L1_Struct (rev R1-1912203).docx [retrieved on Nov. 15, 2019] section 7.3, pp. 26-27, Section 2.

(Continued)

*Primary Examiner* — Rebecca E Song
(74) *Attorney, Agent, or Firm* — Procopio, Cory, Hargreaves & Savitch

(57) ABSTRACT

Aspects of a methods, apparatus, and computer-readable medium for wireless communication at a wireless device are provided herein. The wireless device may receive a configuration for a resource pool for sidelink communication, the resource pool having a plurality of physical resource blocks (PRBs) including a first set of PRBs that are grouped in one or more sub-channels, each sub-channel having an equal number of PRBs, and a second set of PRBs that are not in the one or more sub-channels having the equal number of PRBs. The apparatus may transmit in the second set of PRBs. The second set of PRBs may not be monitored by a receiving device.

34 Claims, 9 Drawing Sheets

(56) References Cited

U.S. PATENT DOCUMENTS

| | | | | |
|---|---|---|---|---|
| 2020/0029318 A1* | 1/2020 | Guo | | H04W 72/042 |
| 2020/0366419 A1* | 11/2020 | Panteleev | | H04L 1/1854 |
| 2021/0194652 A1* | 6/2021 | Khoryaev | | H04L 5/0051 |
| 2021/0321403 A1* | 10/2021 | Ye | | H04L 5/0048 |
| 2022/0061041 A1* | 2/2022 | Chen | | H04L 5/0048 |

OTHER PUBLICATIONS

International Search Report and Written Opinion—PCT/US2021/027114—ISA/EPO—dated Jul. 26, 2021.

LG Electronics: "Discussion on Physical Layer Structure for NR Sidelink", 3GPP Draft, 3GPP TSG RAN WG1 Meeting #100bis, R1-2001884, 3rd Generation Partnership Project (3GPP), Mobile Competence Centre, vol. RAN WG1, No. Online Meeting, Apr. 20, 2020-Apr. 30, 2020, Apr. 11, 2020 (Apr. 11, 2020), XP051875320, 38 pages, Retrieved from the Internet: URL: https://ftp.3gpp.org/tsg_ran/WG1_RL1/TSGR1_100b_e/Docs/R1-2001884.zip R1-2001884 Discussion on physical layer structure for NR sidelink_f.docx [retrieved on Apr. 11, 2020] p. 14.

Spreadtrum Communications: "Remaining Issues of Physical Layer Structure for Sidelink," 3GPP Draft, 3GPP TSG RAN WG1 #100bis, R1-2002265, 3rd Generation Partnership Project (3GPP), Mobile Competence Centre, vol. RAN WG1, No. e-Meeting, Apr. 20, 2020-Apr. 30, 2020, Apr. 11, 2020 (Apr. 11, 2020), XP051875509, 8 pages, Retrieved from the Internet: URL: https://ftp.3gpp.org/tsg_ran/WG1_RL1/TSGR1_100b_e/Docs/R1-2002265.zip R1-2002265 Remaining issues of physical layer structure for sidelink.docx [retrieved on Apr. 11, 2020] p. 3.

\* cited by examiner

UTILIZATION OF ADDITIONAL BANDWIDTH IN A SIDELINK RESOURCE POOL

CROSS REFERENCE TO RELATED APPLICATION(S)

This application claims the benefit of U.S. Provisional Application Ser. No. 63/025,880, entitled "Utilization of Additional Bandwidth in a Sidelink Resource Pool" and filed on May 15, 2020, which is expressly incorporated by reference herein in its entirety.

BACKGROUND

Technical Field

The present disclosure relates generally to communication systems, and more particularly to wireless communication based on sidelink, such as vehicle-to-everything (V2X) or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. The apparatus may receive a configuration for a resource pool for sidelink communication, the resource pool having a plurality of physical resource blocks (PRBs) including a first set of PRBs that are grouped in one or more sub-channels, each sub-channel having an equal number of PRBs, and a second set of PRBs that are not in the one or more sub-channels having the equal number of PRBs. The apparatus may transmit in the second set of PRBs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
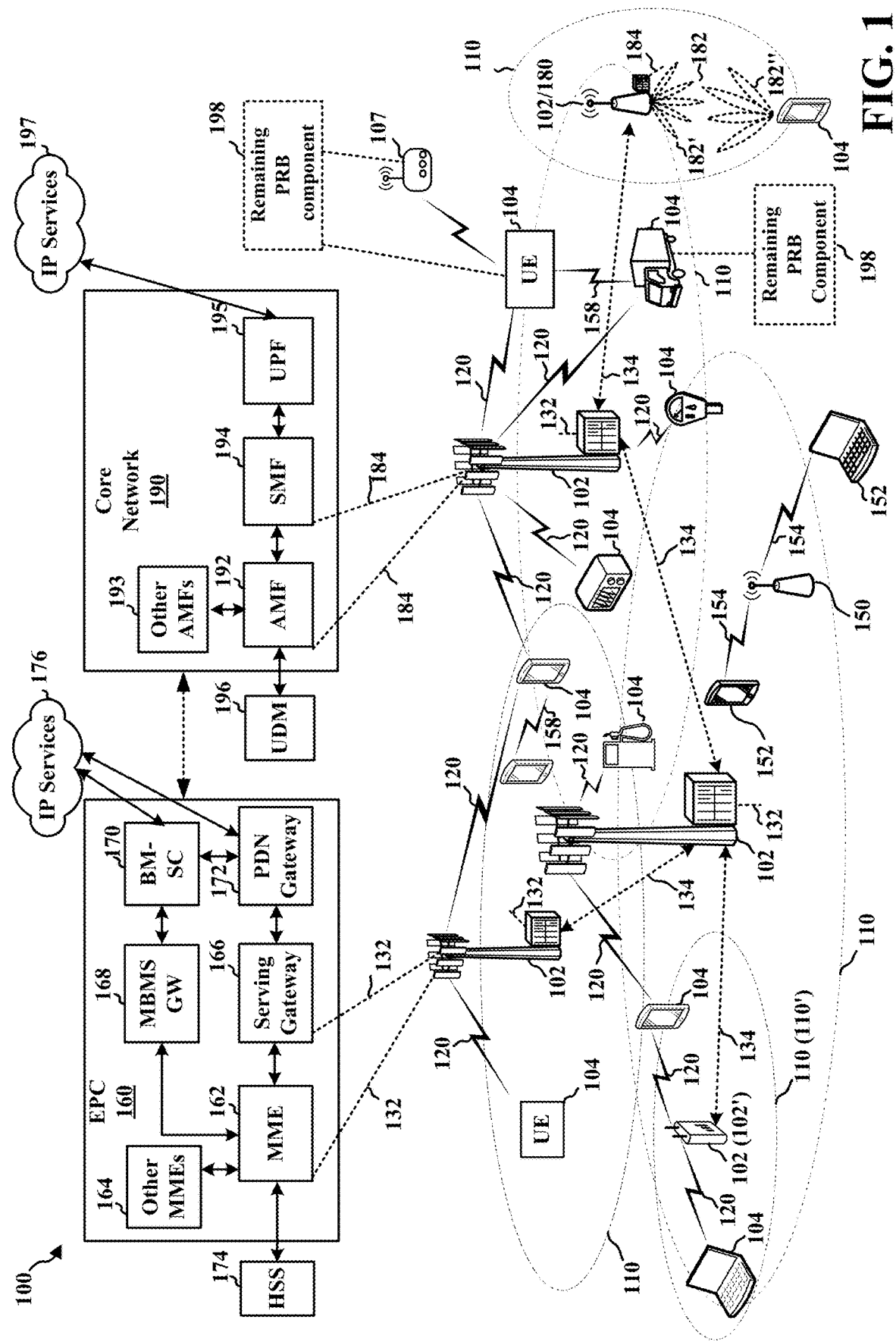
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Sidelink communication, such as V2X, may be exchanged using a non-centralized allocation scheme in which a base station does not allocate the resources or using a centralized scheme in which a base station allocates the resource. A resource pool for the communication may include a bandwidth that spans a number of PRBs. The bandwidth may be separated into sub-channels having a defined size. The size of the resource pool, e.g., the total number of PRBs in the resource pool, and the number of PRBs in a sub-channel may be configured. The total number of PRBs of the resource pool may be separated into sub-channels having equal numbers of PRBs according to the configuration. However, the total number of PRBs may not be a multiple of a sub-channel size. The PRBs that are grouped into the equal sized sub-channels may include a first set of PRBs from the resource pool, and the remaining PRBs may form a second set of PRBs from the resource pool. The term remaining PRBs may refer to the PRBs that are not grouped into the equal sized sub-channels due to the number of PRBs not being a multiple of the configured size of the sub-channels. The remaining PRBs could be grouped into one or more sub-channels smaller than the defined size, included in other sub-channels to form sub-channels larger than the defined size, or not grouped or included in a sub-channel. Aspects presented herein enable a more efficient use of the PRBs of a sidelink resource pool by enabling the remaining PRBs, which are not grouped into a sub-channel of the defined size according to the configured sub-channel size, to be used for sidelink communication.

As presented herein, a transmitting device may use the remaining PRBs to transmit, and the PRBs may not be monitored by a receiving device for sidelink communication. Thus, the transmitting device may use the remaining PRBs for transmissions that are not intended to be received by the receiver.

FIG. 1 is a diagram illustrating an example of a wireless communications system and an access network 100. Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication-based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

In some examples, the UE 104 may communicate using a sidelink resource pool having a plurality of PRBs including a first set of PRBs that comprises one or more sub-channels having an equal number of PRBs and a second set of PRBs that are not in the one or more sub-channels having the equal number of PRBs. The UE 104 may include a remaining PRB component 198 configured to transmit in the second set of PRBs.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
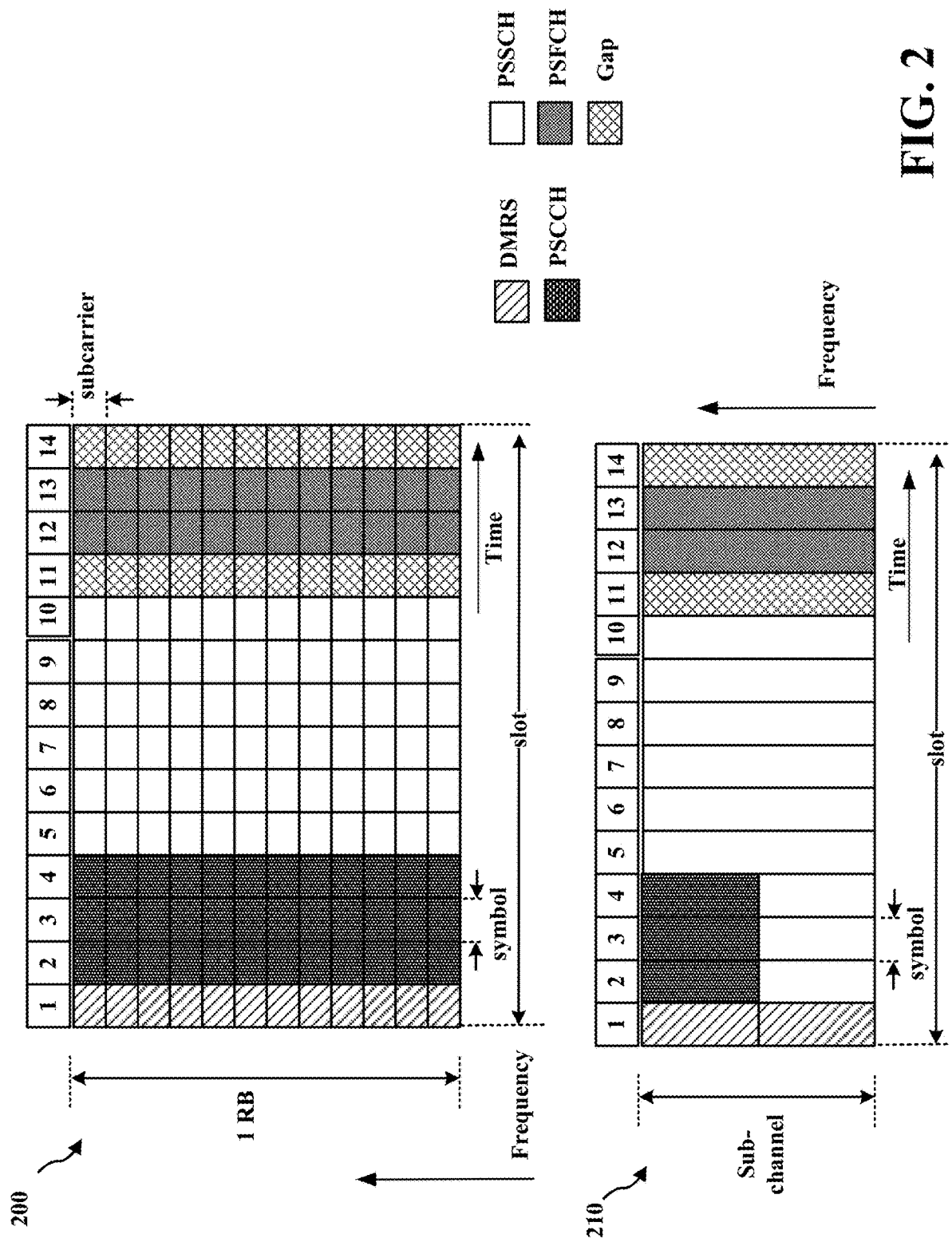
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
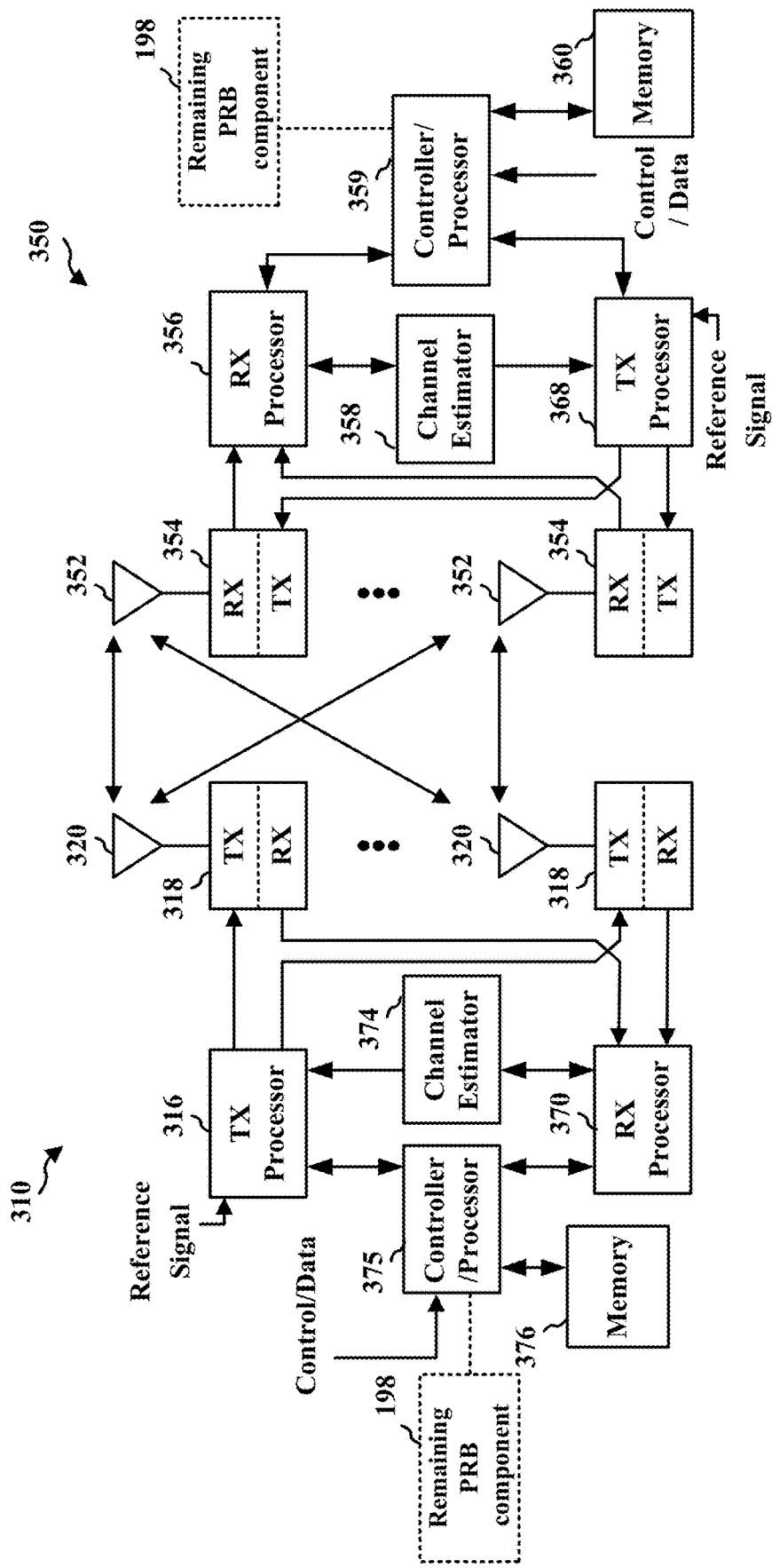
FIG. 3 is a diagram illustrating an example of a first device and a second device involved in wireless communication based, e.g., on sidelink.

FIG. 3 is a block diagram of a first wireless communication device 310 in communication with a second wireless communication device 350. In some examples, the devices 310 and 350 may communicate based on sidelink, such as V2X or other D2D communication. The communication may be based, e.g., on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with the remaining PRB component 198 of FIG. 1.

Figure 4:
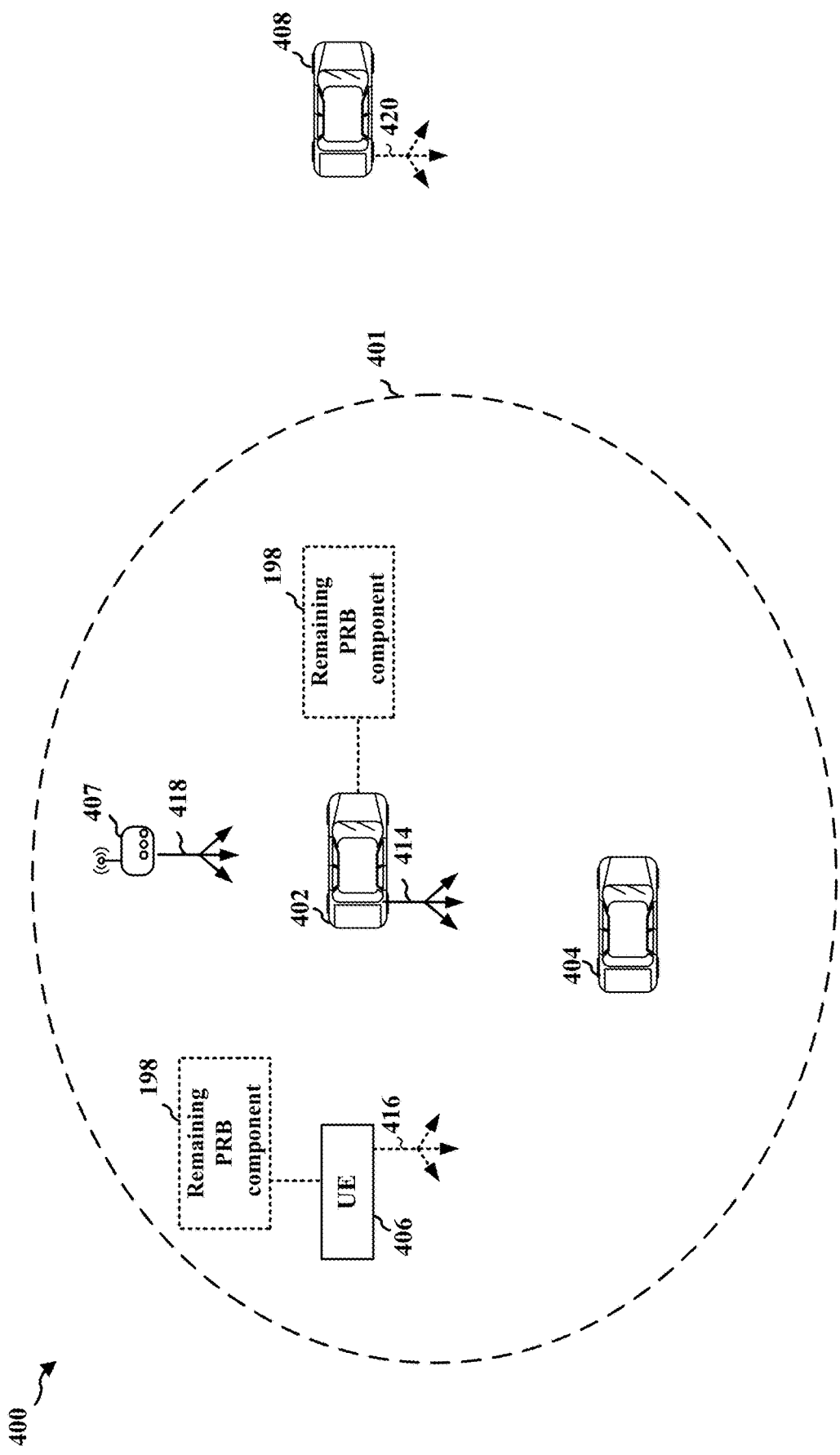
FIG. 4 illustrates an example of communication between wireless devices based on sidelink.

FIG. 4 illustrates an example 400 of wireless communication between devices based on V2X or other D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. A control channel may include sidelink control information (SCI) with information for decoding a data channel. The SCI may also be used by a receiving device to avoid interference by refraining from transmitting on the occupied resources or resources reserved by another UE. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast or unicast to nearby devices. For example, UE 414 may transmit communication intended for receipt by other UEs within a range 401 of UE 414. Additionally/alternatively, RSU 407 may receive communication from and/or transmit communication 418 to UEs 402, 404, 406, 408.

UE 402, 404, 406, 408 or RSU 407 may comprise a remaining PRB component 198, as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, the UE may determine a set of candidate resources (e.g., by monitoring SCI from other UEs and removing resources from the set of candidate resources that are reserved by other UEs in a signal for which the UE measures an RSRP above a threshold value). Then, the UE may select N resources for transmissions and/or retransmissions of a TB. As an example, the UE may randomly select the N resources from the set of candidate resources determined in the first step. After selecting the resources, for each transmission, the UE may reserve future time and frequency resources for an initial transmission and up to two retransmissions.

Figure 5:
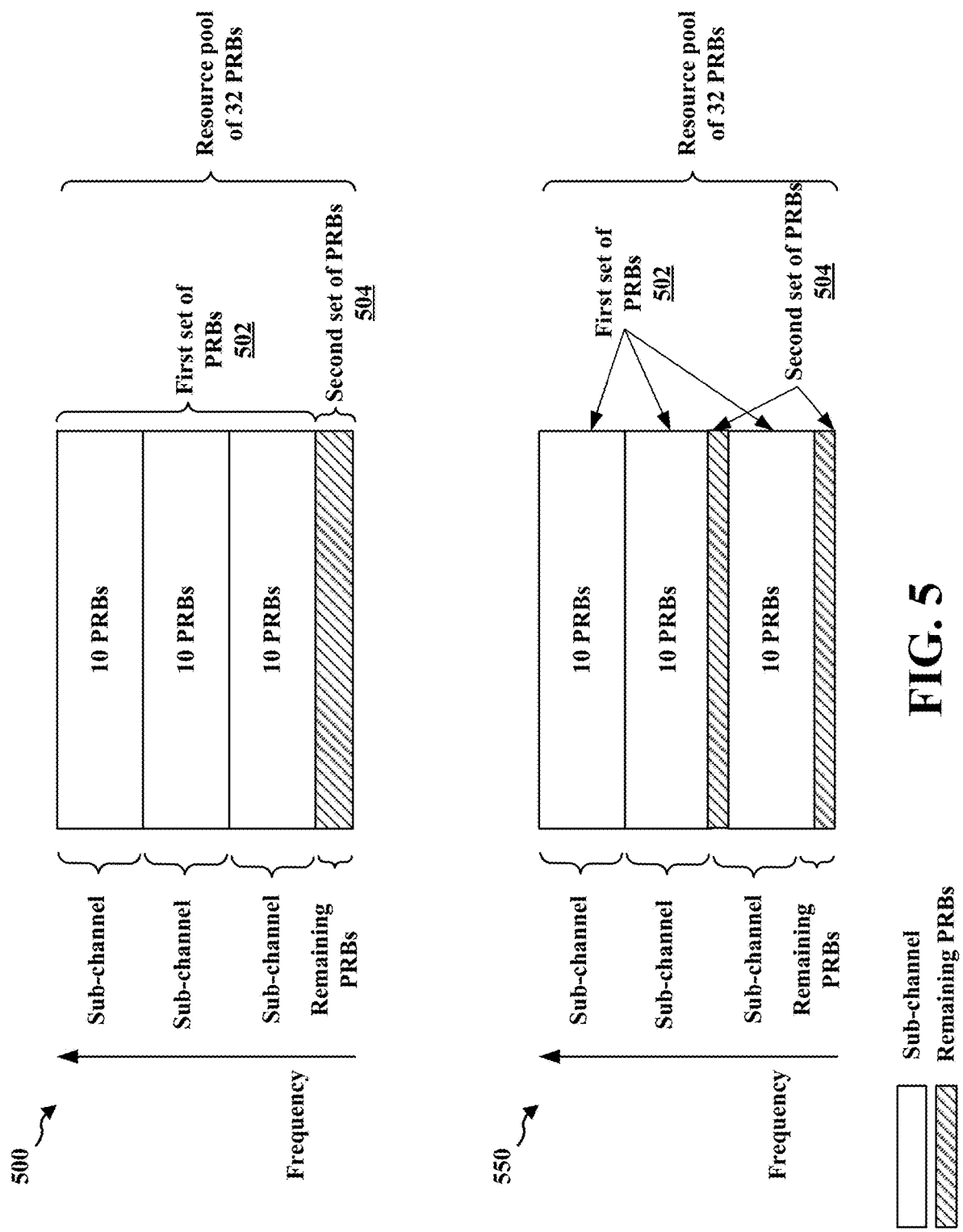
FIG. 5 illustrates examples of resource pools for sidelink communication.

A resource pool for the communication may include a bandwidth that spans a number of PRBs. The bandwidth may be separated into sub-channels having a defined size. The size of the resource pool, e.g., the total number of PRBs in the resource pool may be configured. A sub-channel size may also be configured. For example, a number of PRBs in a sub-channel may be configured per resource pool. As illustrated in the example in FIG. 5, the total number of PRBs of the resource pool 500 may be separated into sub-channels having equal numbers of PRBs according to the configuration. However, the total number of PRBs may not be a multiple of a sub-channel size. For example, in FIG. 5, the bandwidth of the resource pool is 32 PRBs. The resource pool may be configured to have a sub-channel size of 10 PRBs. Thus, three sub-channels having 10 PRBs are provided, and there are 2 remaining PRBs. The PRBs that are grouped into the equal sized sub-channels may include a first set of PRBs 502 from the resource pool, and the remaining PRBs may form a second set of PRBs 504 from the resource pool. The term remaining PRBs may refer to the PRBs that are not grouped into the sub-channels due to the number of PRBs not being a multiple of the configured size of the sub-channels. For example, the 3 remaining PRBs in FIG. 5 are due to the number of 32 PRBs not being a multiple of the 10 PRB size of the sub-channels. The specific example of 32 PRBs and a sub-channel size of 10 is merely to illustrate the concept. The concepts presented herein may be applied to a resource pool including any number of PRBs and to any size of sub-channels. Additionally, the position of the remaining PRBs in FIG. 5 is merely to illustrate the concept of the remaining PRBs. The remaining PRBs, e.g., the second set of PRBs 504, may be located at a bandwidth edge of the resource pool, such as shown in the example resource pool 500, and/or between sub-channels, such as shown in the example resource pool 550 in FIG. 5. The second set of PRBs may be a consecutive group of PRBs, as in the example resource pool 500, or may be spaced apart, such as in the example resource pool 550.

The remaining PRBs that are not grouped into the equally sized sub-channels may be wasted resources leading to inefficient use of the bandwidth. In order to address the potential for wasted resources, sub-channel sizes may be added per subcarrier spacing and bandwidth, which may lead to the addition of different sub-channels and may add to system complexity. In some examples, an edge sub-channel may be larger than the other to include the remaining PRBs. However, the different sized sub-channel leads to a lack of user or sub-channel symmetry. A UE may be more likely to select the edge sub-channel that has the larger bandwidth, which may increase the probability of contention and degrade system performance. A UE may not prefer the edge sub-channel because the modulation and coding scheme (MCS) may be determined based on the configured sub-channel size or the regular sub-channel size. This may limit the benefit of the extra bandwidth provided by the incorporation of the additional PRBs into an edge sub-channel. Receiver complexity may also be increased to support the two different sub-channel sizes, e.g., to support two different PSCCH hypotheses.

As presented herein, the transmitting device may use the excess bandwidth, e.g., the remaining PRBs or second set of PRBs, for improving transmission. The transmitting device may transmit a waveform or signal in the excess bandwidth that is not intended to be received by a receiving device. For example, the excess bandwidth may be defined as being available for user transmissions and may be ignored by receivers.

In a first example, the additional bandwidth may be used for tone reservation, e.g., as part of a peak to average power ratio (PAPR) reduction method.

The availability of the excess bandwidth, e.g., to all user devices, may maintain symmetry among devices using the resource pool. For example, each of the devices may be able to re-use the same excess bandwidth to transmit such signaling, e.g., for transmitting a signal in reserved tones to reduce PAPR. For example, in a 40 MHz bandwidth, there may be 106 PRBs and 10 sub-channels of 10 PRBs. There may be 10 users, each using a sub-channel. Each of these 10 users, can use the remaining 6 PRBs and transmit a PAPR reduction signal. It is not a problem that multiple UEs transmit in the remaining PRBs in an overlapping manner because the receiving devices may ignore the remaining PRBs and may not attempt to receive communication in the remaining PRBs.

The use of the excess bandwidth may enable users to increase the transmission power, which may provide a range advantage. Additionally, the receiver side processing is not impacted because receivers may ignore the excess bandwidth.

In another example, transmitting devices may use the excess bandwidth for training purposes, e.g., to transmit a training signal. For example, the transmitting devices may transmit a waveform to improve transmission, such as to train a pre-distortion (DPD) module to improve adjacent channel leakage ratio (ACLR) or improve error vector magnitude (EVM). The transmitting device may simultaneously transmit and receive a waveform in the excess bandwidth to improve transmission. As in the other examples, the transmitted waveform does not interfere with reception, because receiving devices may ignore the PRBs of the excess bandwidth.

Figure 6:
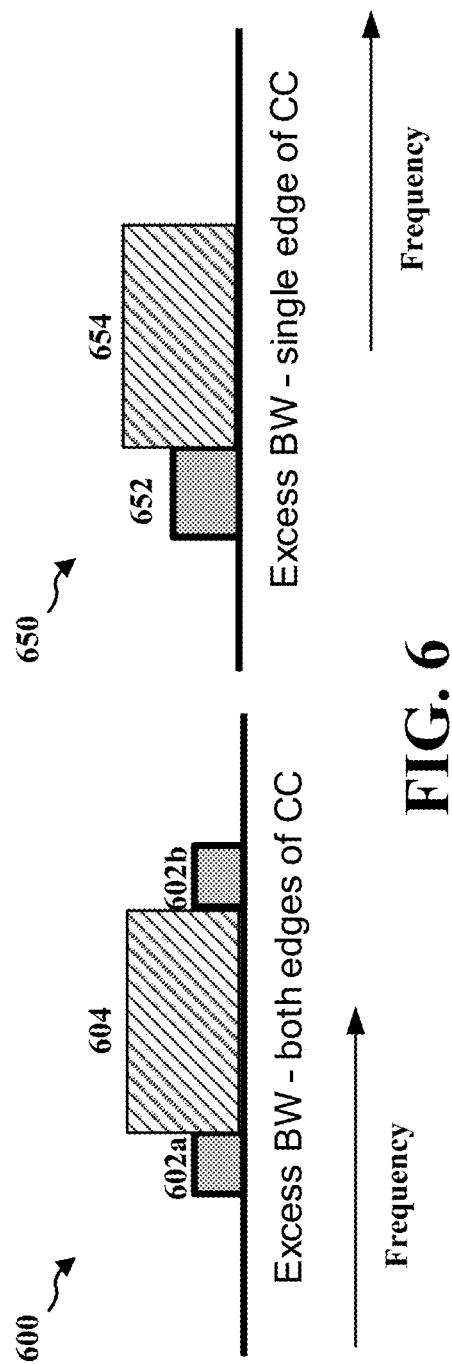
FIG. 6 illustrates examples of sets of PRBs.

FIG. 6 further illustrates examples of the second set of PRBs that may be used by a transmitting device, as described herein. As illustrated in 600, the second set of PRBs, or remaining PRBs, may be separated into two groups 602a and 602b located on both edges of a component carrier (CC) 604. In another example, illustrated at 650 the second set of PRBs, e.g., the remaining PRBs, may be in a single group 652 located on one edge of a CC 654. The remaining PRBs may be referred to herein as excess bandwidth of the resource pool, e.g., bandwidth that is not separated into the equal sized sub-channels having the configured number of PRBs.

Figure 7:
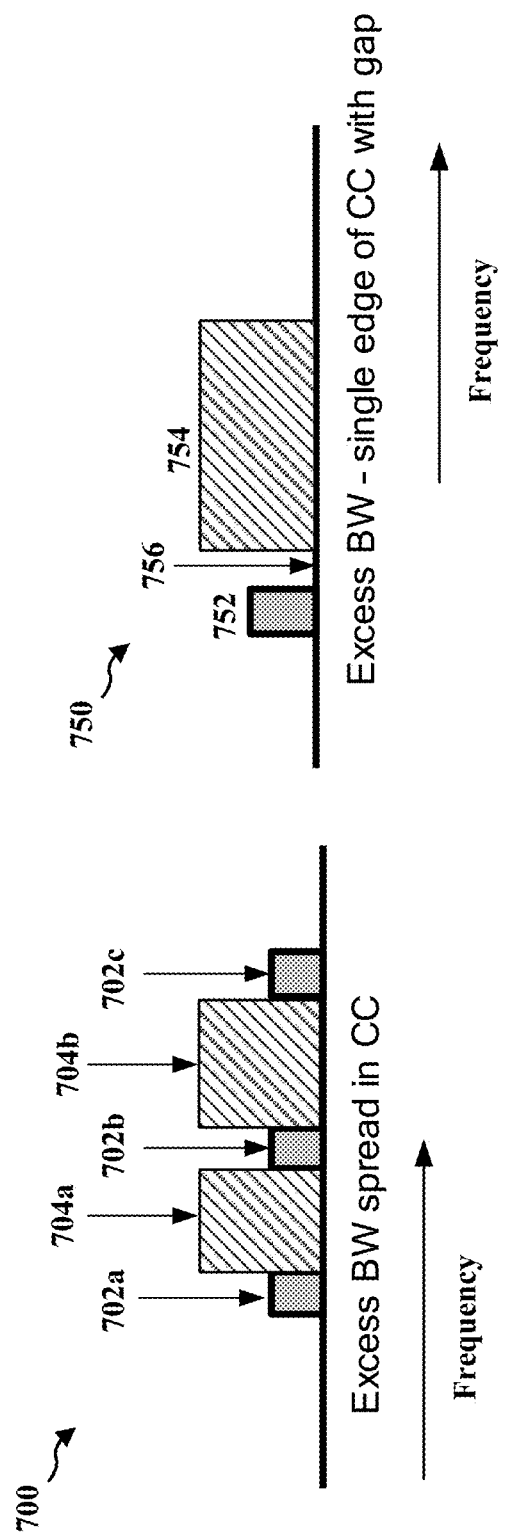
FIG. 7 further illustrates examples of sets of PRBs.

FIG. 7 further illustrates examples of the second set of PRBs that may be used by a transmitting device, as described herein. As illustrated in 700, the second set of PRBs may be separated into several groups 702a, 702b, and 702c that is spread out in multiple CCs 704a and 704b. In another example, as illustrated in 750, the second set of PRBs may be placed at 752 near an edge of the CC 754. A gap 756 may be introduced between the second set of PRBs at 752 and the CC 754. The gap may be one or more of the remaining PRBs that are not used for transmission.

Figure 8:
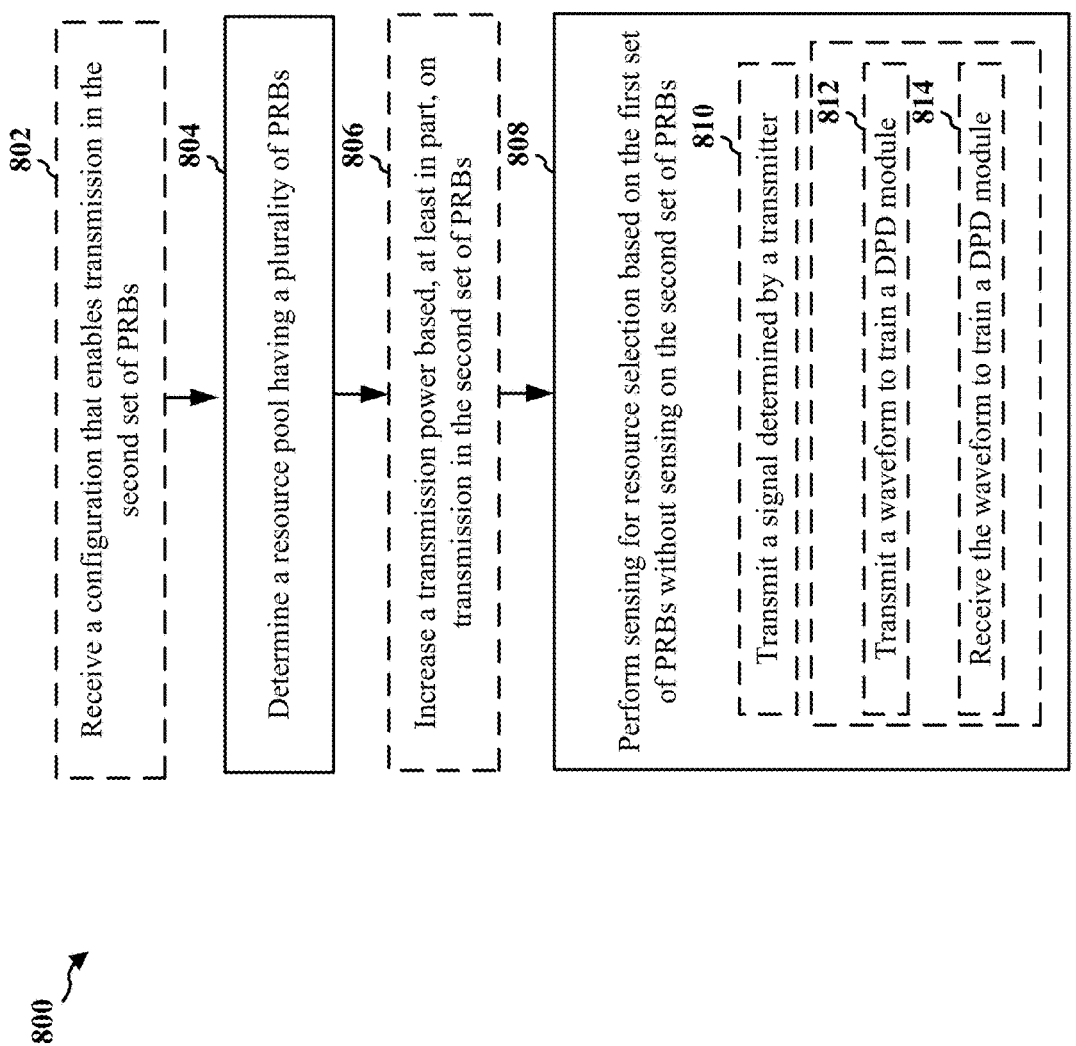
FIG. 8 is a flowchart of a method of wireless communication.

FIG. 8 is a flowchart 800 of a method of wireless communication. The method may be performed by a wireless device communicating based on sidelink (e.g., a UE 104, an RSU 107, a device 310, 350; the apparatus 902). Optional aspects are illustrated with a dashed line. The method may improve the efficient use of PRBs within a resource pool.

In some examples, as illustrated at 802, the wireless device may receive a configuration that enables transmission in a second set of PRBs relative to a first set of PRBs. The configuration may be for a resource pool having a plurality of PRBs including the first set of PRBs that includes one or more sub-channels having an equal number of PRBs and the second set of PRBs that are not in the one or more sub-channels having the equal number of PRBs. In some aspects, the transmission is a transmission in sidelink communication. The first set of PRBs includes one or more sub-channels having an equal number of PRBs and the second set of PRBs are not in the one or more sub-channels having the equal number of PRBs. The reception 802 may be performed, e.g., by the configuration reception component 942 of the apparatus 902 in FIG. 9. By enabling transmission in the second set of PRBs, the wireless device may utilize resources (the second set of PRBs) that might not be otherwise utilized. Therefore, the transmission in sidelink communication may be enhanced, such as by increasing transmission power.

At 804, the wireless device determines a resource pool having a plurality of PRBs including the first set of PRBs that includes one or more sub-channels having an equal number of PRBs and the second set of PRBs that are not in the one or more sub-channels having the equal number of PRBs. The number of the plurality of PRBs in the resource pool may be configured. The number of PRBs in each sub-channel may also be configured. FIG. 5 illustrates examples of sidelink resource pools. The determination 804 may be performed, e.g., by the resource pool component 944 of the apparatus 902 in FIG. 9. In some aspects, the plurality of PRBs span a bandwidth and the second set of PRBs are grouped at an edge of the bandwidth, such as the PRBs illustrated at 652 in FIG. 6. In some aspects, the second set of PRBs are grouped in a first group at a first edge of the bandwidth and a second group at a second edge of the bandwidth, such as the PRBs illustrated at 602a and 602b in FIG. 6. In some aspects, at least a portion of the second set of PRBs is positioned between sub-channels, such as the PRBs illustrated at 702a, 702b, and 702c in FIG. 7. In some aspects, there may be a gap between the bandwidth and the second set of PRBs, such as the PRBs illustrated at 752 in FIG. 7. In some aspects, the second set of PRBs is separated from the one or more sub-channels by at least one PRB that is not used for transmission by the wireless device. In some aspects, the second set of PRBs may be placed based on known interference for the wireless device.

At 806, the wireless device increases a transmission power of the first set of PRBs based, at least in part, on transmission in the second set of PRBs. The increase 806 may be performed, e.g., by the transmission power enhancement component 946 and/or the transmission component 934 of the apparatus 902 in FIG. 9.

At 808, the wireless device performs sensing for resource collection based on the first set of PRBs without sensing on the second set of PRBs. In other words, the second set of PRBs may be ignored for the sensing. The exclusion and the sensing 808 may be performed, e.g., by the sensing component 948 and/or the reception component 930 of the apparatus 902 in FIG. 9. In some aspects, the second set of PRBs are not monitored for receiving sidelink communication. Because the second set of PRBs are not monitored for receiving sidelink communication, the reception processing for sidelink communication is not affected by the second set of PRBs even though the transmission for sidelink communication may be enhanced by the second set of PRBs.

At 810, the wireless device transmits a signal determined by a transmitter. The signal may be transmitted in the second set of PRBs and in the first set of PRBs. The transmission, at 810, may be performed, e.g., by signal transmission component 950 and/or the transmission component 934 of the apparatus 902 in FIG. 9. In some aspects, the wireless device transmits in the second set of PRBs based on the configuration. In some aspects, the signals that are transmitted in the second set of PRBs are determined for a PAPR reduction of a transmission signal on the first set of PRBs. In some aspects, the wireless device transmits in the second set of PRBs further based on transmitting in an adjacent sub-channel to the second set of PRBs.

At 812, the wireless device transmits a waveform in the second set of PRBs to train a DPD module. At 814, the wireless device may receive the transmitted waveform in the second set of PRBs to train the DPD module. The transmission 812 may be performed, e.g., by the transmission component 934 and/or the training waveform transmission component 952 of the apparatus 902 in FIG. 9. The reception 814 may be performed, e.g., by the training waveform reception component 954 of the apparatus 902 in FIG. 9. In some aspects, the transmission at 812 and the reception at 814 may be performed periodically. In some aspects, the second set of PRBs may be used for high peak-to-average power ratio (PAPR) of the transmitted signal by tone reservation method when the waveform for training is not being transmitted or received. In some aspects, the DPD is trained to improve adjacent channel leakage ratio (ACLR). In some aspects, the DPD may be trained to improve error vector magnitude (EVM), i.e., difference between an ideal received waveform (which would be the training waveform transmitted) and the measured waveform for allocated resource blocks. In some aspects, the DPD may be trained to increase transmission power. In some aspects, because the second set of PRBs are not monitored for receiving sidelink transmission, the transmission and reception of the training waveforms will not interfere with the sidelink transmission.

Figure 9:
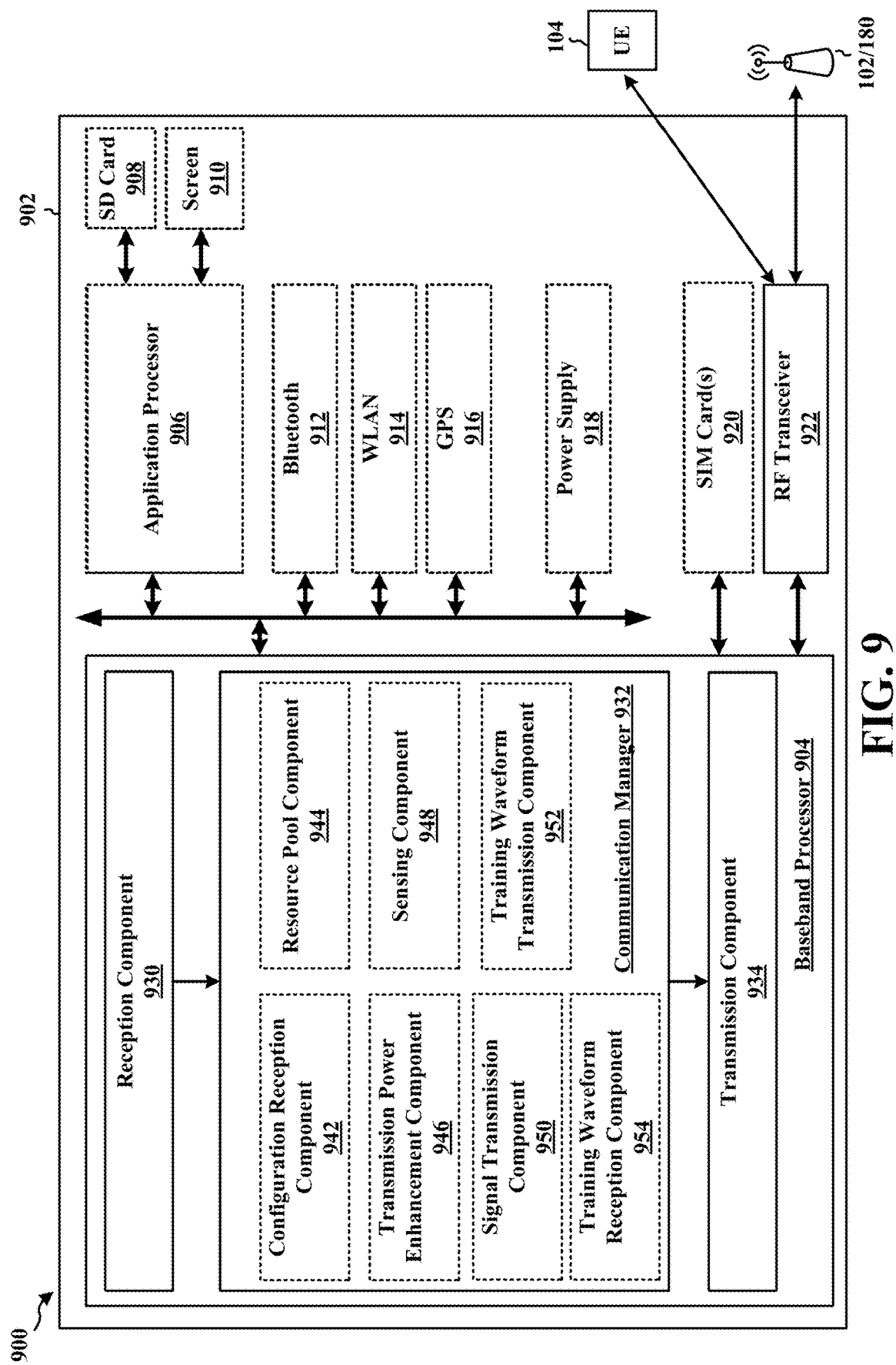
FIG. 9 is a diagram illustrating an example of a hardware implementation for an example apparatus.

FIG. 9 is a diagram 900 illustrating an example of a hardware implementation for an apparatus 902. In some aspects, the apparatus 902 may be a UE and includes a baseband processor 904 (also referred to as a modem) coupled to an RF transceiver 922. In some aspects, the baseband processor 904 may be a cellular baseband processor, and the RF transceiver 922 may be a cellular RF transceiver. The apparatus may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and/or a power supply 918. The baseband processor 904 communicates through the RF transceiver 922 with the UE 104 and/or BS 102/180. The baseband processor 904 may include a computer-readable medium/memory. The baseband processor 904 is responsible for general processing, including the execution of software stored on the computer-readable medium/memory. The software, when executed by the baseband processor 904, causes the baseband processor 904 to perform the various functions described supra. The computer-readable medium/memory may also be used for storing data that is manipulated by the baseband processor 904 when executing software. The baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband processor 904. The baseband processor 904 may be a component of the device 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be an entire UE (e.g., see 350 of FIG. 3) and include the additional modules of the apparatus 902.

The communication manager 932 includes a configuration reception component 942 component that is configured to receive a configuration that enables transmission in a second set of PRBs relative to a first set of PRBs.

The communication manager 932 further includes a resource pool component 944 that is configured to determine a resource pool having a plurality of PRBs including the first set of PRBs that includes one or more sub-channels having an equal number of PRBs and the second set of PRBs that are not in the one or more sub-channels having the equal number of PRBs.

The communication manager 932 further includes a transmission power enhancement component 946 that is configured to increase a transmission power of the first set of PRBs based, at least in part, on transmission in the second set of PRBs.

The communication manager 932 further includes a sensing component 948 that is configured to perform sensing for resource collection based on the first set of PRBs without sensing on the second set of PRBs.

The communication manager 932 further includes a signal transmission component 950 that is configured to transmit a signal determined by a transmitter on the second set of PRBs.

The communication manager 932 includes a training waveform transmission component 952 that is configured to transmit a training waveform to train a DPD module.

The communication manager 932 includes a training waveform reception component 954 that is configured to receive the training waveform to train the DPD module.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband processor 904, includes means for determining a resource pool for sidelink communication, the resource pool having a plurality of PRBs including a first set of PRBs that are grouped in one or more sub-channels, each sub-channel having an equal number of PRBs, and a second set of PRBs that are not in the one or more sub-channels having the equal number of PRBs. The apparatus may further include means for transmitting in the second set of PRBs.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a wireless device, comprising: receiving a configuration for a resource pool for sidelink communication, the resource pool having a plurality of PRBs including a first set of PRBs that are grouped in one or more sub-channels, each sub-channel having an equal number of PRBs, and a second set of PRBs that are not in the one or more sub-channels having the equal number of PRBs; and transmitting in the second set of PRBs.

In aspect 2, the method of aspect 1 further includes that the second set of PRBs are not monitored for receiving the sidelink communication.

In aspect 3, the method of aspect 1 or aspect 2 further includes that the configuration enables transmission in the second set of PRBs, and wherein the wireless device transmits in the second set of PRBs based on the configuration.

In aspect 4, the method of any of aspects 1-3 further includes that wireless device transmits signals determined by a transmitter.

In aspect 5, the method of aspect 4 further includes that the signals that are transmitted in the second set of PRBs are determined for a PAPR reduction of a transmission signal on the first set of PRBs.

In aspect 6, the method of any of aspects 1-5 further includes increasing a transmission power of the first set of PRBs based, at least in part, on transmission in the second set of PRB s.

In aspect 7, the method of any of aspects 1-6 further includes that the wireless device transmits in the second set of PRBs further based on transmitting in an adjacent sub-channel to the second set of PRBs.

In aspect 8, the method of any of aspects 1-7 further includes transmitting a waveform in the second set of PRBs to train a DPD module.

In aspect 9, the method of any of aspects 1-8 further includes that the plurality of PRBs span a bandwidth, and wherein the second set of PRBs are grouped at an edge of the bandwidth.

In aspect 10, the method of any of aspects 1-8 further includes that the plurality of PRBs span a bandwidth, and wherein the second set of PRBs are grouped in a first group at a first edge of the bandwidth and a second group at a second edge of the bandwidth.

In aspect 11, the method of any of aspects 1-8 further includes that at least a portion of the second set of PRBs is positioned between sub-channels.

In aspect 12, the method of any of aspects 1-8 further includes that the second set of PRBs is separated from the one or more sub-channels by at least one PRB that is not used for transmission by the wireless device.

Aspect 13 is an apparatus for wireless communication at a wireless device, comprising means for performing the method of any of aspects 1-12.

Aspect 14 is an apparatus for wireless communication at a wireless device, comprising memory and at least one processor coupled to the memory, the memory and the at least one processor being configured to perform the method of any of aspects 1-12.

Aspect 15 is a non-transitory computer-readable storage medium storing computer executable code at a wireless device, the code when executed by a processor causes the processor to perform the method of any of aspects 1-12.

What is claimed is:

1. An apparatus of wireless communication at a wireless device, comprising:
    a memory; and
    at least one processor coupled to the memory, the memory and the at least one processor configured to:
        receive a configuration for a resource pool for sidelink communication, the resource pool having a plurality of physical resource blocks (PRBs) including a first set of PRBs that are grouped in one or more sub-channels, each sub-channel having an equal number of PRBs, and a second set of PRBs that are not in the one or more sub-channels having the equal number of PRBs; and
        transmit in the second set of PRBs at least one of:
            signals that are determined for a peak to average power ratio (PAPR) reduction of a transmission signal on the first set of PRBs, or
            a waveform to train a digital pre-distortion (DPD) module.

2. The apparatus of claim 1, wherein the second set of PRBs are not monitored for receiving the sidelink communication.

3. The apparatus of claim 1, wherein the configuration enables transmission in the second set of PRBs, and wherein the wireless device transmits in the second set of PRBs based on the configuration.

4. The apparatus of claim 1, wherein the signals in the second set of PRBs are determined by a transmitter.

5. The apparatus of claim 4, wherein the signals that are transmitted in the second set of PRBs are determined for the PAPR reduction of the transmission signal on the first set of PRBs.

6. The apparatus of claim 1, wherein the memory and the at least one processor are further configured to:
    increase a transmission power of the first set of PRBs based, at least in part, on transmission in the second set of PRBs.

7. The apparatus of claim 1, wherein the wireless device transmits in the second set of PRBs further based on transmitting in an adjacent sub-channel to the second set of PRBs.

8. The apparatus of claim 1, wherein
    the signals that are transmitted in the second set of PRBs include the waveform to train the DPD module.

9. The apparatus of claim 1, wherein the plurality of PRBs span a bandwidth, and wherein the second set of PRBs are grouped at an edge of the bandwidth.

10. The apparatus of claim 1, wherein the plurality of PRBs span a bandwidth, and wherein the second set of PRBs are grouped in a first group at a first edge of the bandwidth and a second group at a second edge of the bandwidth.

11. The apparatus of claim 1, wherein at least a portion of the second set of PRBs is positioned between sub-channels.

12. The apparatus of claim 1, wherein the second set of PRBs is separated from the one or more sub-channels by at least one PRB that is not used for transmission by the wireless device.

13. A method of wireless communication at a wireless device, comprising:
receiving a configuration for a resource pool for sidelink communication, the resource pool having a plurality of physical resource blocks (PRBs) including a first set of PRBs that are grouped in one or more sub-channels, each sub-channel having an equal number of PRBs, and a second set of PRBs that are not in the one or more sub-channels having the equal number of PRBs; and
transmitting in the second set of PRBs at least one of:
signals that are determined for a peak to average power ratio (PAPR) reduction of a transmission signal on the first set of PRBs, or
a waveform to train a digital pre-distortion (DPD) module.

14. The method of claim 13, wherein the second set of PRBs are not monitored for receiving the sidelink communication.

15. The method of claim 13, wherein the configuration enables transmission in the second set of PRBs, and wherein the wireless device transmits in the second set of PRBs based on the configuration.

16. The method of claim 13, wherein the signals in the second set of PRBs are determined by a transmitter.

17. The method of claim 16, wherein the signals that are transmitted in the second set of PRBs are determined for the PAPR reduction of the transmission signal on the first set of PRBs.

18. The method of claim 13, further comprising:
increasing a transmission power of the first set of PRBs based, at least in part, on transmission in the second set of PRBs.

19. The method of claim 13, wherein the wireless device transmits in the second set of PRBs further based on transmitting in an adjacent sub-channel to the second set of PRBs.

20. The method of claim 13:
wherein the signals that are transmitted in the second set of PRBs include the waveform to train the DPD module.

21. The method of claim 13, wherein the plurality of PRBs span a bandwidth, and wherein the second set of PRBs are grouped at an edge of the bandwidth.

22. The method of claim 13, wherein the plurality of PRBs span a bandwidth, and wherein the second set of PRBs are grouped in a first group at a first edge of the bandwidth and a second group at a second edge of the bandwidth.

23. The method of claim 13, wherein at least a portion of the second set of PRBs is positioned between sub-channels.

24. The method of claim 13, wherein the second set of PRBs is separated from the one or more sub-channels by at least one PRB that is not used for transmission by the wireless device.

25. An apparatus of wireless communication at a wireless device, comprising:

means for receiving a configuration for a resource pool for sidelink communication, the resource pool having a plurality of physical resource blocks (PRBs) including a first set of PRBs that are grouped in one or more sub-channels, each sub-channel having an equal number of PRBs, and a second set of PRBs that are not in the one or more sub-channels having the equal number of PRBs; and
means for transmitting in the second set of PRBs at least one of:
signals that are determined for a peak to average power ratio (PAPR) reduction of a transmission signal on the first set of PRBs, or
a waveform to train a digital pre-distortion (DPD) module.

26. The apparatus of claim 25, wherein the second set of PRBs are not monitored for receiving the sidelink communication.

27. The apparatus of claim 25, wherein the configuration enables transmission in the second set of PRBs, and wherein the wireless device transmits in the second set of PRBs based on the configuration.

28. The apparatus of claim 25, wherein the signals that are transmitted in the second set of PRBs are determined for the PAPR reduction of the transmission signal on the first set of PRBs.

29. The apparatus of claim 25, wherein the signals that are transmitted in the second set of PRBs include the waveform to train the DPD module.

30. A non-transitory computer-readable storage medium storing computer executable code at a wireless device, the code when executed by a processor causes the processor to:
receive a configuration for a resource pool for sidelink communication, the resource pool having a plurality of physical resource blocks (PRBs) including a first set of PRBs that are grouped in one or more sub-channels, each sub-channel having an equal number of PRBs, and a second set of PRBs that are not in the one or more sub-channels having the equal number of PRBs; and
transmit in the second set of PRBs at least one of:
signals that are determined for a peak to average power ratio (PAPR) reduction of a transmission signal on the first set of PRBs, or
a waveform to train a digital pre-distortion (DPD) module.

31. The non-transitory computer-readable medium of claim 30, where the second set of PRBs are not monitored for receiving the sidelink communication.

32. The non-transitory computer-readable medium of claim 30, wherein the configuration enables transmission in the second set of PRBs, and wherein the wireless device transmits in the second set of PRBs based on the configuration.

33. The non-transitory computer-readable medium of claim 30, wherein the signals that are transmitted in the second set of PRBs are determined for the PAPR reduction of the transmission signal on the first set of PRBs.

34. The non-transitory computer-readable medium of claim 30, wherein the signals that are transmitted in the second set of PRBs include the waveform to train the DPD module.

* * * * *